Figure 1:
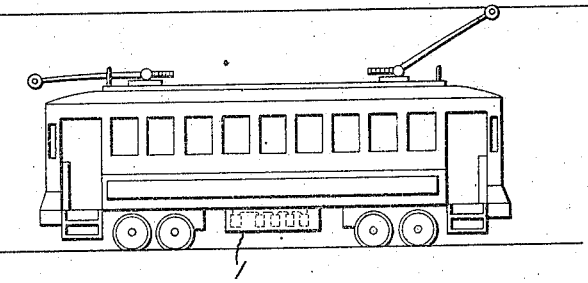

E. E. F. CREIGHTON.
PROTECTION DEVICE FOR STREET CARS.
APPLICATION FILED JUNE 12, 1913.

1,119,576.

Patented Dec. 1, 1914.

Witnesses
Chas B Stokes
J. Ellis Glen

Inventor
Elmer E.F. Creighton
by Albert G. Davis
His Attorney

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTION DEVICE FOR STREET-CARS.

1,119,576.

Specification of Letters Patent.

Patented Dec. 1, 1914.

Original application filed June 7, 1912, Serial No. 702,223. Divided and this application filed June 12, 1913. Serial No. 773,151.

*To all whom it may concern:*

Be it known that I, ELMER E. F. CREIGHTON, a citizen of the United States, residing at Schenectady, county of Schenectady, State of New York, have invented certain new and useful Improvements in Protection Devices for Street-Cars, of which the following is a specification.

My invention relates to protective devices for electrically driven vehicles, and more particularly to protective devices suitable for use on street cars or similar vehicles and having a discharge path consisting in part of electrolytic cells or similar devices which must be connected at intervals to a source of potential in order to keep them in operative condition.

This application is a division of my application Serial No. 702,223, filed June 7, 1912, now Patent No. 1,078,131, Nov. 11, 1913.

Satisfactory protection of the motors of street cars against lightning is difficult if lightning arresters of the ordinary spark gap type are used, as the normal operating voltage is so low that great difficulty is experienced in making a spark gap arrester of the usual type which will break down quickly upon a slight rise in voltage above normal and which will at the same time be rugged and durable enough to withstand the hard usage to which it is subjected when mounted upon a street car. In order that the spark gap arrester may not be rendered inoperative by dust, dirt, and splashing of metal in the spark discharge, the gaps are usually made so large that a very considerable rise in voltage is necessary before the gaps will break down and permit the lightning to discharge to ground, and as a consequence of the time required to break down such a gap, the motors are often injured even though the spark gap arresters are in good condition. Electrolytic cells can easily be proportioned to discharge at a voltage very slightly above the normal operating voltage of a street car and when discharging will permit such a large flow of current that the motors are well protected. The electrolytic cells consist essentially of aluminum electrodes immersed in a suitable electrolyte and covered with an insulating film which must be maintained in good condition in order that the cell may be operative. In order to maintain the insulating film on the electrodes, the cells should be connected at intervals to the line or other suitable source of voltage, but electrolytic cells installed on a street car are apt to be rendered inoperative by neglect and by failure to charge them often enough to maintain the film in operative condition. For this reason electrolytic cells have not heretofore been used to any considerable extent as protective devices for motors on street cars.

The object of my invention is to provide means by which electrolytic protective devices for systems supplying translating devices, such as motors, are automatically maintained in good condition without any manipulation on the part of the operator other than that incidental to the operation of the translating devices. To this end, I provide means by which the electrolytic cells are automatically charged as a result of the normal manipulation and use of the translating devices, so that the operator of the devices necessarily and without attention or care on his part, charges the electrolytic cells often enough to keep them in proper condition. A suitable arrangement for street cars and similar devices, is some means which will automatically connect the electrolytic cells to the line and charge them whenever the car is started or stopped or whenever there is a sufficient variation in its speed. During storms especially good protection may be secured at will by directly connecting the cells to the line and thereby eliminating the spark gap which is normally in series with them. In some cases the desired object may be attained by some form of device which automatically closes the circuit of the electrolytic cells whenever the current supplied to the translating devices varies to considerable extent, or whenever the control apparatus of the translating device is manipulated. When an electro-responsive device is used for this purpose, I prefer to connect it so that it acts as a choke coil to keep the lightning out of the translating devices.

My invention will be best understood in connection with the accompanying drawings which show, merely for the purpose of illustration, some of the various forms in which my invention may be embodied and in which—

Figure 2:
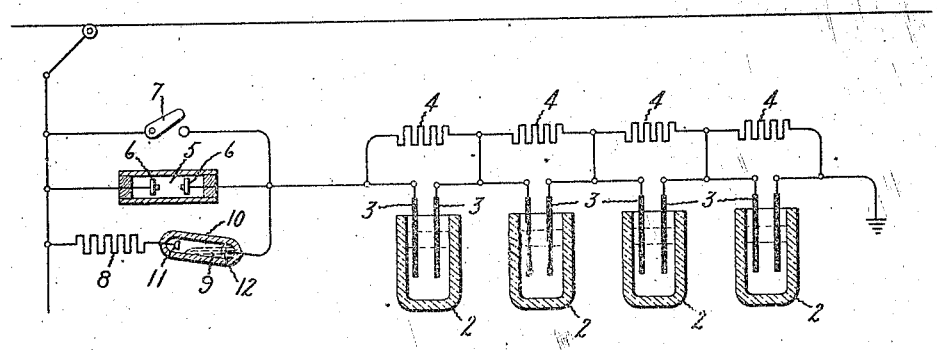
Figure 3:
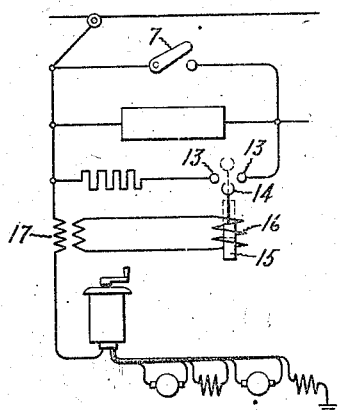
Figure 4:
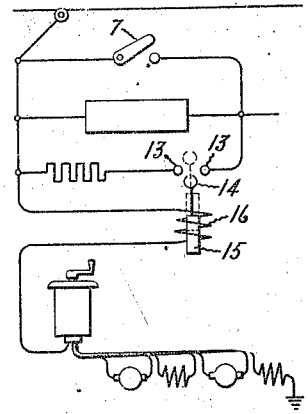

Figure 1 is a street car provided with a protective device embodying my invention; Fig. 2 is a diagram showing the connections of one form of my invention; and Figs. 3 and 4 are diagrams showing connections by which the electrolytic cells are automatically charged in response to the closing and opening of the circuit through the motors.

In the particular arrangement shown in the drawings, the protective device is mounted on the street car in a box 1 which, as shown in Fig. 1, may conveniently be below the floor of the car but which may be mounted in any convenient place on the car so long as the automatic charging mechanism is free to operate. The connections of the protective device will best be understood by referring to Fig. 2, which shows diagrammatically the relation and connections of the various parts of the device. The electrolytic cells, consisting of suitable receptacles 2 containing an electrolyte and aluminum electrodes 3, are connected in series between the trolley and ground. The distribution of current between the cells is controlled by balancing resistances 4 in shunt to the electrodes of the cells. The cells are connected to the trolley through a spark gap 5 of the vacuum type, consisting of a suitable vessel which contains electrodes 6 properly spaced and which is exhausted to such an extent that a voltage slightly above the normal voltage of the trolley, will break down the gap between the electrodes 6 and establish a conducting path to ground. A voltage sufficient to break down the spark gap is high enough to cause a free flow through the electrolytic cells and consequently there is a discharge path to ground as long as the voltage of the trolley is above normal. As soon as the voltage becomes normal, the insulating films on the electrodes of the elctrolytic cells stop the flow of current.

It is not advisable to connect the electrolytic cells directly to the trolley at all times, as the wear and tear upon the cells is greatly increased, but it may be desirable in some cases to be able to connect the cells directly to the trolley during the continuance of storms or similar disturbances and I, therefore, provide a switch 7 by means of which, at will, the spark gap 5 may be short circuited and the electrolytic cells connected directly to the trolley.

The insulating films on the electrodes of the electrolytic cells will gradually dissolve and the cells will become inoperative unless the cells are charged and the films reformed by connecting the cells at intervals to a source of potential, such as the trolley. Experience has shown that manual charging of the cells cannot be depended upon, as through oversight or neglect the charging of the cells is omitted so often that the cells are not kept in proper condition. To overcome this difficulty, I provide means by which the cells are automatically connected to the trolley every time the car is started or stopped so that the cells are kept charged and the films in good condition without any attention on the part of the man in charge of the car. Various forms of automatic devices may be used to automatically eliminate the spark gap 5 and connect the cells directly to the line at intervals. In the preferred construction, as shown in the drawings, the spark gap is shunted by a charging circuit containing a charging resistance 8 for limiting the flow of current through the electrolytic cells while the films are being reformed, and a charging switch or circuit controlling device which will automatically eliminate the spark gap by closing the shunt charging circuit around the spark gap. The automatic charging switch may be closed automatically either by its own inertia in response to the starting or stopping of the car or by responding to variations in current flow through the motor, so that every time the motor is started or stopped the charging circuit will be closed. As the charging of the cells is completed in a very short space of time, all that is necessary to keep the cells in good condition is that the charging circuit be momentarily closed at intervals during the operation of the car.

The particular form of charging switch, shown in Fig. 2, for controlling the charging circuit comprises a body of mercury 9 contained in a vessel 10 which is provided at each end with electrodes 11 and 12. The vessel is slightly inclined and the amount of mercury 9 is so chosen that it can touch both electrodes 11 and 12 and form a conducting bridge between them. Normally the mercury occupies the position shown in the figure and is in contact with the electrode 12, but out of contact with the electrode 11, so that the charging circuit is open. When the car suddenly varies its speed, as in stopping or starting, the mercury 9 by its inertia moves into engagement with the electrode 11 while still touching the electrode 12, thereby closing the charging circuit and forming the films on the electrolytic cells. As soon as the speed of the car becomes uniform or the car stops, the mercury drops back into the position shown in the figure and the charging circuit is opened.

Under some conditions it is desirable to charge the electrolytic cells, forming a discharge path, by an electro-responsive device which closes the charging circuit whenever current is supplied to or is cut off from the apparatus which is to be protected. One form of device by which this result may be obtained is shown in Figs. 3 and 4, in which the contacts 13, in the charging circuit, are momentarily bridged by the bridging contact 14 whenever current is supplied to the motors or whenever the current is cut off from the motors. This result is obtained by an electro-responsive device which will automatically move the bridging contact 14 over the contacts 13 whenever the current is turned on or whenever it is cut off. The particular form of electro-responsive device shown in the drawings comprises an armature or core 15 on which the bridging contact 14 is mounted and this armature or core is lifted by a coil 16 which may be connected directly in series with the trolley, as shown in Fig. 4, or connected to it through a transformer 17, as shown in Fig. 3. When no current is flowing, the armature or core 15 is in the position shown in full lines. When the circuit of the motor is closed, sufficient current flows through the coil 16 to lift the armature into the position shown in dotted lines so that the charging circuit is closed for an instant as the bridging contact 14 passes between the contacts 13. As long as the current is flowing through the motor, the armature or core is in the position shown in dotted lines and the charging circuit is open. When current is cut off from the motor the armature 15 and bridging contact 14 drop back into the position shown in full lines, momentarily closing the charging circuit as they return to the full line position. Both the transformer 17 and the solenoid 16 act as choke coils to keep lightning out of the motors and compel it to pass to ground through the protective device.

The arrangement shown in Figs. 3 and 4 is not limited to street cars and similar vehicles but may be used with advantage in many cases where protective devices consisting of electrolytic cells are used to protect apparatus, such as motors or similar translating devices, which are started and stopped during the day. In such cases the arrangement of my invention shown in Figs. 3 and 4 may advantageously be used to insure that the protective device is always in operative condition.

My invention may be embodied in many other forms than that disclosed and I, therefore, do not limit my invention to the precise arrangement described except in so far as it is limited by the scope of the appended claims.

What I claim as new and desire to secure by Letters Patent of the United States, is:—

1. The combination with a translating device and a protective device for said translating device comprising an electrolytic condenser having a spark gap in series therewith, of means responsive to current flow through said translating device for eliminating said spark gap and thereby maintaining said electrolytic condenser in operative condition.

2. The combination with an electric motor and a protective device for said motor comprising an electrolytic cell having a spark gap in series therewith, of a shunt circuit around said spark gap, and electromagnetic means responsive to current flow through said motor for momentarily closing said shunt circuit when said motor is started or stopped.

3. The combination with an electric motor and its source of supply, of a protective device connected to said source of supply adjacent said motor and comprising a discharge path containing an electrolytic condenser having a spark gap in series therewith, a shunt circuit around said spark gap, an inductance in the circuit between said protective device and the motor, and means responsive to current flow in said inductance for closing said shunt circuit and thereby maintaining said electrolytic condenser in operative condition.

4. The combination with a translating device and a discharge path comprising an electrolytic condenser having a spark gap in series therewith, of a coil connected in series with said translating device between said translating device and said discharge path, an armature for said coil having one position when the coil is energized and a second position when the coil is deënergized, and means controlled by said armature for eliminating said spark gap when said armature is intermediate said two positions.

5. The combination with a translating device and a discharge path comprising an electrolytic condenser having a spark gap in series therewith, of a shunt circuit around said spark gap having coöperating contacts therein, a coil connected in series with said translating device between said translating device and said discharge path, and a core for said coil connected to said coöperating contacts to hold said shunt circuit open when said coil is energized and when said coil is deënergized and to close said shunt circuit momentarily during movement of said core.

6. The combination with a translating device and a controller for said device, of an electrolytic protective device having a spark gap in series therewith, and means responsive to the movement of said controller for connecting said protective device directly to the line to be protected as said controller is actuated.

The combination with a translating device and a controller for said device, of an electrolytic protective device having a spark gap in series therewith, and means responsive to the movement of said controller for shunting said spark gap to connect said protective device directly to the line to be protected as said controller is actuated.

8. The combination with a translating device and a controller for said device, of an electrolytic protective device having a spark gap in series therewith, a shunt circuit around said gap, and electromagnetic means responsive to the movement of said controller for momentarily closing said shunt circuit as said controller is operated.

In witness whereof, I have hereunto set my hand this 10th day of June 1913.

ELMER E. F. CREIGHTON.

Witnesses:
BENJAMIN B. HULL,
HELEN ORFORD.